(12) United States Patent
Morihisa

(10) Patent No.: US 12,292,397 B2
(45) Date of Patent: May 6, 2025

(54) X-RAY FLUORESCENCE ANALYZER

(71) Applicant: Shimadzu Corporation, Kyoto (JP)

(72) Inventor: Yuji Morihisa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 221 days.

(21) Appl. No.: 18/013,205

(22) PCT Filed: Dec. 7, 2020

(86) PCT No.: PCT/JP2020/045375
§ 371 (c)(1),
(2) Date: Dec. 27, 2022

(87) PCT Pub. No.: WO2022/004000
PCT Pub. Date: Jan. 6, 2022

(65) Prior Publication Data
US 2023/0296541 A1 Sep. 21, 2023

(30) Foreign Application Priority Data
Jun. 30, 2020 (JP) ................................ 2020-112575

(51) Int. Cl.
*G01N 23/223* (2006.01)
(52) U.S. Cl.
CPC .................. *G01N 23/223* (2013.01)
(58) Field of Classification Search
CPC ............... G01N 23/223; G01N 2223/317
See application file for complete search history.

(56) References Cited

U.S. PATENT DOCUMENTS

| 5,832,054 | A | * | 11/1998 | Kuwabara | ............ | G01N 23/223 378/80 |
| 2008/0212736 | A1 | * | 9/2008 | Klein | .................. | G01N 23/223 378/45 |
| 2014/0294143 | A1 | * | 10/2014 | Nohara | ................ | G01N 23/223 378/44 |

(Continued)

FOREIGN PATENT DOCUMENTS

| CN | 109239117 A | 1/2019 |
| JP | 2005-098906 A | 4/2005 |
| WO | 2014/192173 A1 | 12/2014 |

OTHER PUBLICATIONS

Office Action dated Jul. 18, 2023 for corresponding application No. JP 2022-533027.

(Continued)

*Primary Examiner* — Edwin C Gunberg
*Assistant Examiner* — Richard O Toohey
(74) *Attorney, Agent, or Firm* — Muir Patent Law, PLLC

(57) ABSTRACT

Provided is an X-ray fluorescence analyzer capable of reducing consumption of a gas constituting a measurement atmosphere. The X-ray fluorescence analyzer is provided with a sample chamber configured to place a sample therein, a measurement chamber arranged adjacent to the sample in the sample chamber, an X-ray tube configured to irradiate the sample with X-rays, and a detector configured to detect the X-rays reflected by the sample. The detector is provided with a passage through which the X-rays reflected by the sample pass, the passage being positioned in the measurement chamber, and a hole connecting the passage and an outside of the detector.

9 Claims, 3 Drawing Sheets

(56) References Cited

U.S. PATENT DOCUMENTS

2016/0116424 A1    4/2016   Furukawa et al.

OTHER PUBLICATIONS

PCT Written Opinion of the International Searching Authority (Form PCT/ISA/237) for PCT application No. PCT/JP2020/045375, dated Feb. 22, 2021.
EESR dated Jul. 12, 2024 for corresponding application No. EP 20943522.

* cited by examiner

X-RAY FLUORESCENCE ANALYZER

TECHNICAL FIELD

The present invention relates to an X-ray fluorescence analyzer.

BACKGROUND OF THE INVENTION

An energy-dispersive X-ray fluorescence analyzer is a device capable of analyzing the type and the concentration of an element constituting a sample by irradiating the sample with X-rays and detecting the fluorescent X-rays generated from the surface of the sample. With this X-ray fluorescence analyzer, it is possible to non-destructively and easily analyze a wide range of samples, including a solid and a liquid. In order to detect a light element sensitive to a measurement atmosphere in an X-ray fluorescence analyzer, it is required to perform the measurement in a state in which the sample chamber and the measurement chamber are vacuumed. In contrast, in order to measure a sample that generates a gas or a fluid sample, it is useful to replace the inner atmosphere of the sample chamber and the measurement chamber with a helium gas.

However, in a case where the sample chamber and the measurement chamber filled with air are replaced with a helium gas, the helium gas atmosphere of the sample chamber and the measurement chamber may include a slight residual air in the measurement chamber, which affects the measurement.

In order to solve the above-described problems, an X-ray fluorescence analyzer for improving a replacement rate with a helium gas is disclosed, for example, in WO 2014/192173 (Patent Document 1). This document discloses that by providing a first introduction pipe and a second introduction pipe for introducing a helium gas, the helium gas stagnated in the introduction port and the detection port can be reliably replaced with the atmosphere.

PRIOR ART DOCUMENT

Patent Document

Patent Document 1: WO 2014/192173

SUMMARY OF THE INVENTION

Problems to be Solved by the Invention

However, in the case of performing measurements while supplying a helium gas, which is an atmospheric gas, to the detection port in the device disclosed in Patent Document 1, the helium gas consumption increases.

Under the circumstance, the present invention has been made to solve the above-described problems. It is an object of the present invention to provide an X-ray fluorescence analyzer capable of reducing the consumption of a gas constituting a measurement atmosphere.

Means for Solving the Problem

According to a first aspect of the present invention, an X-ray fluorescence analyzer is provided with:
- a sample chamber configured to place a sample therein;
- a measurement chamber arranged adjacent to the sample in the sample chamber;
- an X-ray tube configured to irradiate the sample with X-rays; and
- a detector configured to detect the X-rays reflected by the sample.

The detector is provided with:
- a passage through which the X-rays reflected by the sample pass, the passage being positioned in the measurement chamber; and
- a hole connecting the passage and an outside of the detector.

Effects of the Invention

The X-ray fluorescence analyzer according to the present invention is provided with a sample chamber configured to place a sample therein, a measurement chamber arranged adjacent to the sample in the sample chamber, an X-ray tube configured to irradiate the sample with X-rays, and a detector configured to detect X-rays reflected by the sample. Further, the detector is provided with a passage through which X-rays reflected by the sample pass, the passage being positioned in the measurement chamber, and a hole connecting the passage and an outside of the detector. Therefore, even in a case where a gas accumulates in the passage, the gas can be discharged through the hole. Consequently, it is possible to prevent the gas from being stagnated in the detector without supplying the gas constituting the atmosphere during the measurement, which can reduce the consumption of the gas constituting the atmosphere.

The hole may extend from the passage to the outside of the detector such that the hole has a vertically downward component. In this case, a relatively heavy air flows through the hole having a vertically downward component in a light gas atmosphere, such as, e.g., a helium gas atmosphere, so that the air can be smoothly discharged from the passage.

The hole may extend at an outlet of the hole from the passage to the outside of the detector to be away from the X-ray tube. In this case, since the hole extends at an outlet of the hole to be away from the X-ray tube, scattered X-rays generated from the periphery of the X-ray tube can be prevented from entering the detector from the outlet of the hole.

The hole may extend in an L-shape. In this case, by forming the hole in an L-shape along the detector, it is possible to form a hole that can easily prevent X-rays from entering therefrom.

EMBODIMENTS FOR CARRYING OUT THE INVENTION

Embodiments (Overall Configuration)

Figure 1:
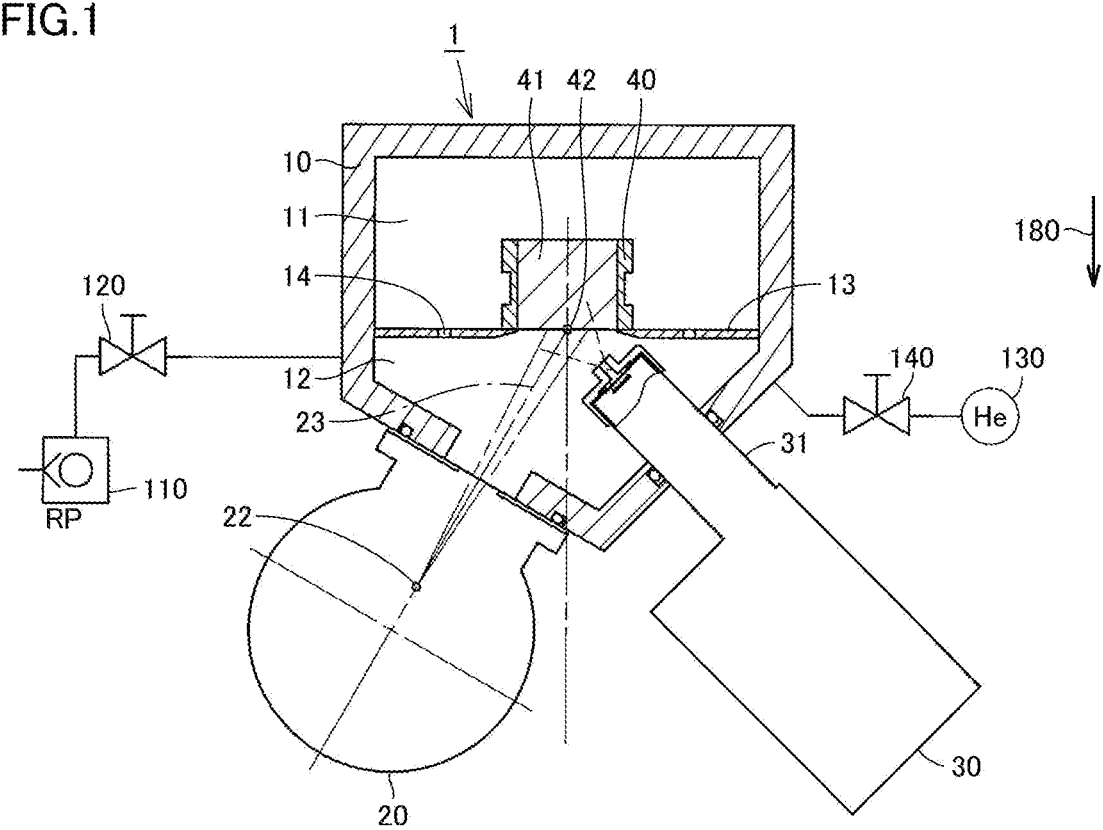
FIG. 1 is a cross-sectional view of an X-ray fluorescence analyzer 1 according to an embodiment.

FIG. 1 is a cross-sectional view of an X-ray fluorescence analyzer 1 according to an embodiment. As shown in FIG. 1, the X-ray fluorescence analyzer 1 is provided with a shielding wall 10 defining a sample chamber 11 and a measurement chamber 12, an X-ray tube 20 attached to the shielding wall 10, and a detector 30 attached to the shielding wall 10 on the other side of the X-ray tube 20.

The shielding wall 10 shields the X-rays emitted from the X-ray tube 20 into the measurement chamber 12 and the sample chamber 11 not to leak to the outside. The shielding wall 10 surrounds the sample chamber 11 and the measurement chamber 12. The sample chamber 11 and the measurement chamber 12 are partitioned from each other by a partition wall 13. The partition wall 13 is provided with a plurality of ventilation passages 14. The ventilation passage 14 communicates with the sample chamber 11 and the measurement chamber 12, and therefore, the sample chamber 11 and the measurement chamber 12 have the same pressure.

A case 40 including the sample 41 is arranged in the sample chamber 11. The sample 41 may be either a solid or a liquid. A thin film (not shown) is provided on the bottom surface of the case 40. The sample 41 is placed on the film. In a case where the sample 41 is a solid, it may be a large lump or a powder.

The measurement chamber 12 is provided below the sample chamber 11. An X-ray tube 20 for irradiating the sample 41 with X-rays 23 is mounted on the outside of the shielding wall 10. The X-rays 23 generated at the X-ray generation point 22 of the X-ray tube 20 are irradiated onto the lower surface 42 of the sample 41 after passing through a band-pass filter (not shown) and a primary collimator (not shown).

A rotary pump 110 and a valve 120 allow the pressure in the sample chamber 11 and the measurement chamber 12 to be adjusted. Specifically, by driving the rotary pump 110 with the valve 120 opened, the sample chamber 11 and the measurement chamber 12 can be evacuated by the action of the rotary pump 110.

A helium cylinder 130 and a valve 140 allow the helium pressure in the sample chamber 11 and the measurement chamber 12 to be adjusted. Specifically, by supplying a helium gas from the helium cylinder 130 with the valve 140 opened, the sample chamber 11 and the measurement chamber 12 can be made into a helium gas atmosphere.

The detector 30 has a case 31. The tip end of the case 31 is inserted into the measurement chamber 12, and the rest thereof is not inserted into the measurement chamber 12.

Figure 2:
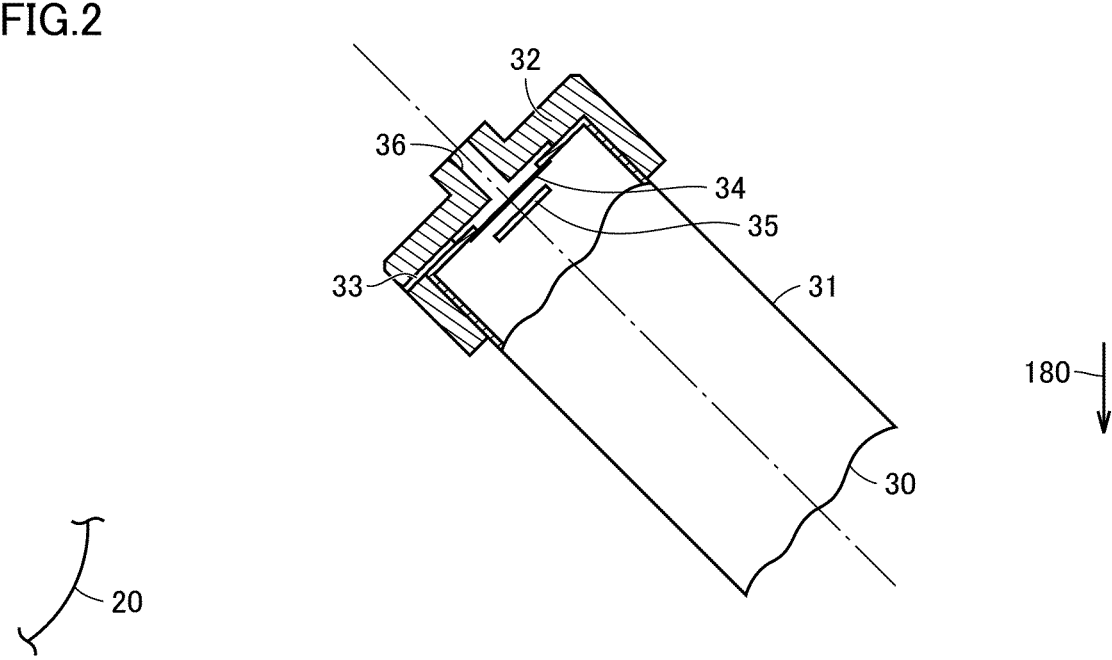
FIG. 2 is a diagram showing a tip end portion of a detector 30.

FIG. 2 is a diagram illustrating the tip end portion of the detector 30. As shown in FIG. 2, the case 31 of the detector 30 is formed in a cylindrical shape. A secondary collimator 32 as a detector cap is provided at the tip end portion of the case 31. The secondary collimator 32 is provided with a passage 36 for allowing the X-rays reflected by the sample 41 to pass through.

As shown in FIG. 1, the X-rays 23 are generally reflected by the sample 41 but also reflected by the portions other than the sample 41. The X-rays reflected by the portions other than the detector 30 reflect the physical properties of the material that reflected the X-rays, and therefore, it is not possible to identify the correct physical properties of the sample 41 when such X-rays are allowed to enter the detector 30.

To prevent this, a secondary collimator 32 having a passage 36 extending in the axial direction is provided at the tip end of the case 31. With this, the inner diameter and the length of the passage 36 are adjusted so that only the X-rays 23 reflected by the lower surface 42 of the sample 41 can pass through the passage 36.

A window member 34 made of, for example, beryllium is provided at the tip end of the case 31. The window member 34 is configured to transmit the X-rays without causing attenuation and partition the inner side of the case 31 and the measurement chamber 12.

A light receiving element 35 made of, for example, a semiconductor is provided inside the case 31. In a case where the light receiving element 35 is made of a semiconductor, when the X-rays pass through the light receiving element 35, a pair of an electron and a positive hole is generated, and the physical properties of the sample based on X-rays can be identified by measuring the current and the voltage due to the pair of an electron and a positive hole.

The secondary collimator 32 is provided with a hole 33 for connecting the passage 36 and the outside of the detector 30. The hole 33 may be formed by, for example, drilling the secondary collimator 32. The hole 33 may be formed of, for example, a pipe.

Effects

In the case of introducing a helium gas, which is lighter than air, into the sample chamber 11 and the measurement chamber 12 in an air atmosphere, the valve 140 is opened to supply the helium gas to the sample chamber 11 and the measurement chamber 12 from the helium cylinder 130. In this instance, the helium gas is introduced gradually from the sample chamber 11 present in the upper part, and then the measurement chamber 12 is filled with the helium gas. Normally, the helium gas should enter the secondary collimator 32 from the passage 36 when the layer of the helium gas is lowered to the height of the secondary collimator 32.

Figure 3:
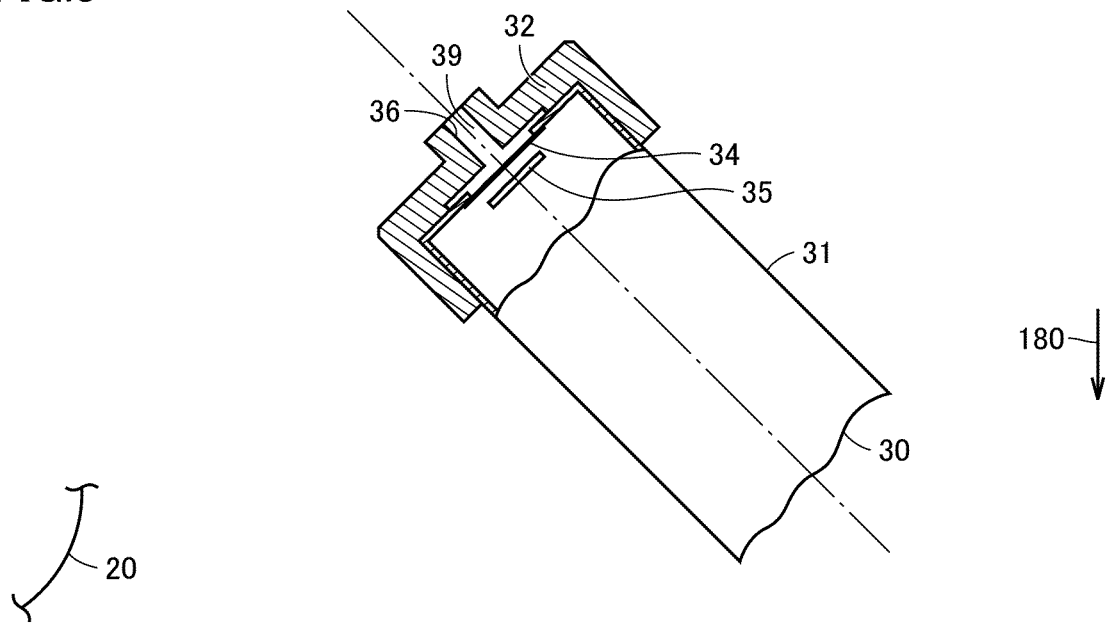
FIG. 3 is a cross-sectional view of a detector according to Comparative Example showing an air stagnation 39.

FIG. 3 is a cross-sectional view of a detector according to Comparative Example for explaining an air stagnation 39. Air is heavier than a helium gas, and therefore, the air will not be discharged from the passage in a state in which the air is stagnated between the secondary collimator 32 and the window member 34. That is, the air stagnation 39 shown in FIG. 3 is generated. In this state, an air layer exists in front of the window member 34. X-rays with weak energy attenuate by this air stagnation 39. The transmittance of the layer of the air (20° C., 1 atm) having an optical path length of 1 mm to F-Kα ray (667 eV) is 29%. On the other hand, the transmittance of the layer of a helium gas (20° C., 1 atm) having an optical path length of 1 mm to F-Kα ray (667 eV) is 99.6%. Therefore, the air stagnation 39 should not be formed when performing fluorescent X-ray analyses in a helium gas atmosphere.

As a first method of not generating an air stagnation inside the secondary collimator 32, it is conceivable that the sample chamber 11 and the measurement chamber 12 are depressurized to discharge the air in advance, and then a helium gas is introduced. In this case, since the air has already been discharged, the air does not stagnate inside the secondary collimator 32. However, this method requires an exhaust pump. Since the analysis is performed in a helium gas atmosphere due to a material, such as, e.g., a liquid sample, that does not allow a vacuum atmosphere, it is not possible to prepare a vacuum atmosphere in advance. Further, it is difficult to install an exhaust system in terms of cost.

As a second method, it is conceivable that a nozzle is attached to the secondary collimator 32 to connect a helium gas line and that a helium gas is injected vigorously into the interior of the secondary collimator 32. With this, the air stagnated in the secondary collimator 32 can be diffused. However, the tip portion of the detector 30 is a location where various mechanisms are provided intensively. Therefore, providing a nozzle at this portion causes a problem that it becomes difficult to assemble the device and perform the maintenance of the device. In addition, a certain flow rate and a certain flow amount of a helium are required to diffuse the air stagnation 39. This causes more helium gas consumption than normally necessary, resulting in high running costs.

In order to diffuse the air stagnation 39 without causing the above-described problems, a hole 33 for discharging the air is provided as shown in FIG. 2. The hole 33 is arranged to have a vertically downward component as indicated by the arrow 180 from the passage 36 to the outside of the detector 30. When the measurement chamber 12 is filled with a helium gas and the layer of the helium gas has reached the secondary collimator 32, the air is discharged from the hole 33. This eliminates the presence of air in front of the window member 34, which can solve the X-ray attenuation problem.

Another Embodiment (First Modification)

Figure 4:
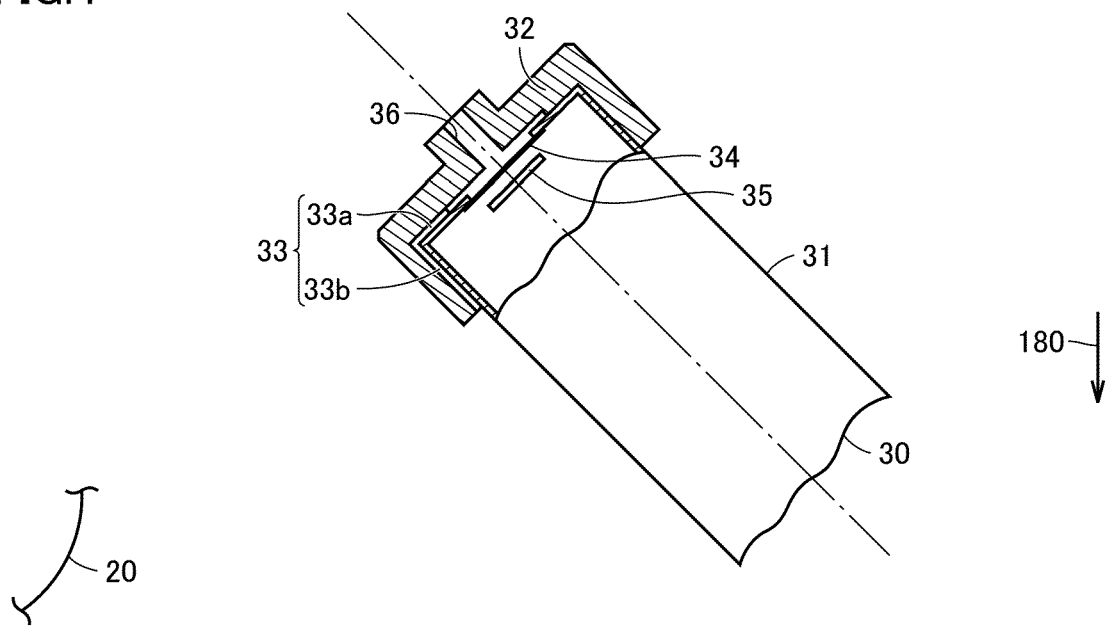
FIG. 4 is a cross-sectional view of a tip portion of a detector 30 according to another embodiment.

FIG. 4 is a cross-sectional view of a tip portion of a detector 30 according to another embodiment. As shown in FIG. 4, in this embodiment, the hole 33 of the detector 30 has a first portion 33a extending in a direction perpendicular to the longitudinal direction of the case 31 and a second portion 33b connected to the first portion 33a, the second portion 33b extending in the longitudinal direction of the case 31.

The hole 33 is formed in an L-shape. The first portion 33a and the second portion 33b of the hole 33 are each formed to have a vertically downward component along this direction to smooth the airflow from the passage 36 to the outside of the detector 30. The second portion 33b constituting the outlet of the hole 33 extends away from the X-ray tube 20 in the above-described airflow direction.

In the hole 33 configured as described above, since the second portion 33b extends away from the X-ray tube 20, the scattered X-rays from the X-ray tube 20 are less likely to enter the second portion 33b. Consequently, it is possible to improve the measurement accuracy by preventing the scattered X-rays from being detected by the detector 30.

Another Embodiment (First Modification)

FIG. 4 is a cross-sectional view of a tip portion of a detector 30 according to another embodiment. As shown in FIG. 4, in this embodiment, the hole 33 of the detector 30 has a first portion 33a extending in a direction perpendicular to the longitudinal direction of the case 31 and a second portion 33b connected to the first portion 33a, the second portion 33b extending in the longitudinal direction of the case 31.

The hole 33 is formed in an L-shape. The first portion 33a and the second portion 33b of the hole 33 are each formed to have a vertically downward component along this direction to smooth the airflow from the passage 36 to the outside of the detector 30. The second portion 33b constituting the outlet of the hole 33 extends away from the X-ray tube 20 in the above-described airflow direction. The length of the second portion 33b can be increased as long as the conductance of the entire hole 33 does not deteriorate. In addition, the hole 33 may have a curved shape instead of an L-shape.

In the hole 33 configured as described above, since the second portion 33b extends away from the X-ray tube 20, the scattered X-rays from the X-ray tube 20 are less likely to enter the second portion 33b. Consequently, it is possible to improve the measurement accuracy by preventing the scattered X-rays from being detected by the detector 30. The larger the aspect ratio of the hole 33 (the length/the inner diameter of the hole 33), the less likely the scattered X-rays will enter the second portion 33b, so it is preferable to increase the aspect ratio as much as possible.

Still Another Embodiment (Second Modification)

Figure 5:
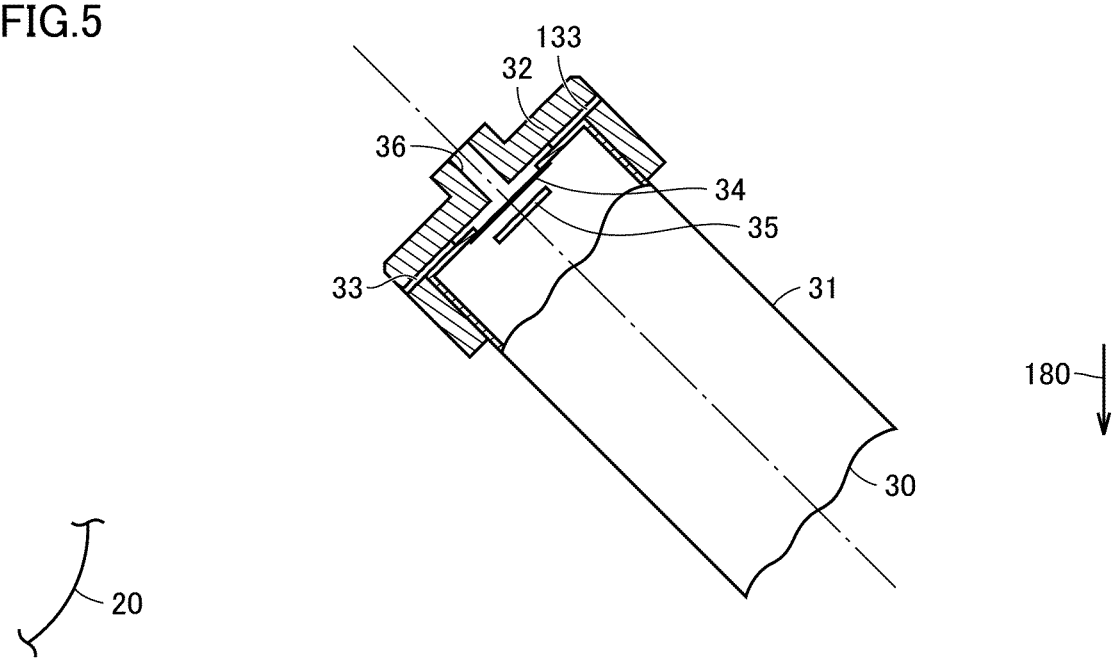
FIG. 5 is a cross-sectional view of a tip portion of a detector 30 according to still another embodiment.

FIG. 5 is a cross-sectional view of a tip portion of a detector 30 according to still another embodiment. As shown in FIG. 5, this embodiment differs from the secondary collimator 32 shown in FIG. 2 in that not only a hole 33 is provided on the lower side of the tip end of the secondary collimator 32 but also a hole 133 is provided on the upper side thereof.

By providing the hole 133, the helium gas in the secondary collimator 32 can be easily discharged. Specifically, in a case where the measurement is completed in a helium gas atmosphere, and then the atmosphere is changed to an atmospheric atmosphere, the helium gas remains inside the secondary collimator 32 at the upper part of the window member 34 due to the lightness of the helium gas, and therefore, the helium gas is less likely to be discharged. This remained helium gas may have some influence on measurement. The presence of the hole 133 facilitates the discharge of the helium gas from the upper portion of the window member 34 and from the interior of the secondary collimator 32. In this embodiment, two holes 33 are 133 are provided. However, two holes 33 and 133 need not necessarily be provided, and only the hole 133 may be provided.

Although some embodiments have been described above, the embodiments described herein can be variously modified. For example, in FIG. 1, the sample 41 is arranged on the upper side of the X-ray tube 20 and the detector 30, but the sample 41 may be arranged on the lower side of the X-ray tube 20 and the detector 30. In this case, the X-rays emitted from the X-ray tube 20 are reflected by the upper surface of the sample 41, and the reflected X-rays are detected by the detector 30.

Those skilled in the art will appreciate that the exemplary embodiments described above are illustrative of the following aspect.

(Item 1)

An X-ray fluorescence analyzer according to one aspect of the present invention includes:

a sample chamber configured to place a sample therein;

a measurement chamber arranged adjacent to the sample in the sample chamber;

an X-ray tube configured to irradiate the sample with X-rays; and a detector configured to detect the X-rays reflected by the sample, wherein the detector is provided with:

a passage through which the X-rays reflected by the sample pass, the passage being positioned in the measurement chamber; and a hole connecting the passage and an outside of the detector.

In the X-ray fluorescence analyzer as recited in the above-described Item 1, the detector is provided with a passage and a hole connecting the passage and the outside of the detector, and therefore, even if a gas is stagnated in the passage, the gas can be discharged through the hole. As a result, it is not necessary to continuously supply the gas constituting the atmosphere during the measurement, which makes it possible to reduce the consumption of the gas.

(Item 2)

In the X-ray fluorescence analyzer as recited in the above-described Item 1, it may be configured such that the hole extends from the passage to the outside of the detector such that the hole has a vertically downward component.

According to the X-ray fluorescence analyzer as recited in the above-described Item 2, since heavy air flows through the hole having a vertically downward component in the helium gas atmosphere, the air can be smoothly discharged from the passage.

(Item 3)

In the X-ray fluorescence analyzer as recited in the above-described Item 1 or 2, it may be configured such that the hole extends at an outlet of the hole from the passage to the outside of the detector to be away from the X-ray tube as shown in FIG. 4.

According to the X-ray fluorescence analyzer as recited in the above-described Item 3, the hole extends away from the X-ray tube in the vicinity of the outlet, and therefore, the scattered X-rays generated from the X-ray tube periphery can be prevented from entering from the outlet of the hole.

(Item 4)

In the X-ray fluorescence analyzer as recited in the above-described Item 3, it may be configured such that the hole extends in an L-shape.

According to the X-ray fluorescence analyzer as recited in the above-described Item 4, by forming an L-shaped hole along the detector, it is possible to easily form a hole capable of preventing X-rays from entering.

The embodiments disclosed herein are to be considered in all respects as illustrative and not restrictive. The scope of the present invention is indicated by the appended claims rather than by the foregoing descriptions, and is intended to include all modifications within the meanings and ranges equivalent to the scope of the claims.

DESCRIPTION OF SYMBOLS

1: X-ray analyzer
10: Shielding wall
11: Sample chamber
12: Measurement chamber
13: Partition wall
14: Ventilation passage
20: X-ray tube
22: X-ray generation point
23: X-ray
30: Detector
31, 40: Case
32: Secondary collimator
33, 133: Hole
33a: First portion
33b: Second portion
34: Window member
35: Light receiving element
36: Passage
41: Sample
42: Lower surface
110: Rotary pump
120, 140: Valve
130: Helium cylinder
180: Arrow

The invention claimed is:

1. An X-ray fluorescence analyzer comprising:
a sample chamber configured to place a sample therein;
a measurement chamber arranged adjacent to the sample in the sample chamber;
an X-ray tube configured to irradiate the sample with X-rays; and
a detector configured to detect X-rays reflected by the sample upon X-ray irradiation,
wherein a collimator is provided at a tip end of the detector, the collimator comprising
a window member,
a passage, having a tip end at a sample chamber side of the passage and a back end at a window member side of the passage, through which passage the X-rays reflected by the sample pass, the passage being positioned in the measurement chamber; and
a first hole, extending from a back end of the passage to an outside of the detector, connecting the passage to outside of the detector.

2. The X-ray fluorescence analyzer as recited in claim 1, wherein the first hole extends from the passage to outside of the detector in a direction that has a vertically downward component.

3. The X-ray fluorescence analyzer as recited in claim 1, wherein the first hole extends from the passage to an outlet of the first hole to outside of the detector, in a direction away from the X-ray tube.

4. The X-ray fluorescence analyzer as recited in claim 3, wherein the first hole extends from the passage to the outlet of the first hole to outside of the detector in an L-shape.

5. The X-ray fluorescence analyzer as recited in claim 1, wherein the first hole is defined by a pipe in the detector.

6. The X-ray fluorescence analyzer as recited in claim 1, wherein the first hole extends from the passage to an outlet of the first hole to outside of the detector in a curved shape.

7. The X-ray fluorescence analyzer as recited in claim 1, wherein the detector further provides a second hole extending from the passage to an outlet of the second hole to outside of the detector.

8. The X-ray fluorescence analyzer as recited in claim 7, wherein the second hole extends from the passage to the outlet of the second hole to outside of the detector in a direction that has a vertically upward component.

9. An X-ray fluorescence analyzer comprising:
a sample chamber configured to place a sample therein;
a measurement chamber arranged adjacent to the sample in the sample chamber;
an X-ray tube configured to irradiate the sample with X-rays; and
a detector configured to detect X-rays reflected by the sample upon X-ray irradiation,
wherein a collimator is provided at a tip end of the detector, the collimator comprising
a window member,
a passage, having a tip end at a sample chamber side of the passage and a back end at a window member side of the passage, through which passage the X-rays reflected by the sample pass, the passage being positioned in the measurement chamber; and
a first hole, extending from a back end of the passage to an outside of the detector, connecting the passage to outside of the detector in a direction that has a vertically upward component.

* * * * *